United States Patent
Heideklang et al.

(10) Patent No.: US 12,444,237 B2
(45) Date of Patent: Oct. 14, 2025

(54) SYNTHETIC GAZE ENROLLMENT

(71) Applicant: Apple Inc., Cupertino, CA (US)

(72) Inventors: Rene Heideklang, Neuenhagen bei Berlin (DE); Hua Gao, San Jose, CA (US); Hao Qin, Saratoga, CA (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 18/470,364

(22) Filed: Sep. 19, 2023

(65) Prior Publication Data
US 2024/0104967 A1    Mar. 28, 2024

Related U.S. Application Data

(60) Provisional application No. 63/376,935, filed on Sep. 23, 2022.

(51) Int. Cl.
*G06V 40/50* (2022.01)
*G06F 3/01* (2006.01)
(Continued)

(52) U.S. Cl.
CPC .............. *G06V 40/50* (2022.01); *G06F 3/013* (2013.01); *G06T 7/70* (2017.01); *G06V 40/19* (2022.01);
(Continued)

(58) Field of Classification Search
CPC ........ G06V 40/50; G06V 40/19; G06V 10/94; G06F 3/013; G06F 3/011; G06T 7/70;
(Continued)

(56) References Cited

U.S. PATENT DOCUMENTS

| 2018/0033405 A1* | 2/2018 | Tall .......................... G06T 9/00 |
| 2022/0050521 A1 | 2/2022 | Drozdov et al. |
| 2022/0239893 A1 | 7/2022 | Matsuda et al. |

OTHER PUBLICATIONS

International Search Report from PCT Application No. PCT/US2023/033538, mailed Jan. 16, 2024, pp. 1-14.

* cited by examiner

*Primary Examiner* — Abhishek Sarma
(74) *Attorney, Agent, or Firm* — Robert C. Kowert; Kowert, Hood, Munyon, Rankin & Goetzel, P.C.

(57) ABSTRACT

A personalized eye model is used to generate synthetic gaze features at ground-truth eye poses $G_g$. Corresponding synthetic gaze poses $G_s$ are estimated from the synthetic gaze features using an average eye model. A linear regression is applied between $G_g$ and $G_s$ to generate a gaze correction function. The gaze correction function represents differences between the synthetic gaze $G_s$ of the subject eye at the display and that of the average eye model $G_g$ at the display, but does not contain security- or privacy-sensitive information. Further, the personalized eye model cannot be recovered from the gaze correction function, and thus the gaze correction function can be stored unencrypted and available for use during a cold boot of a device prior to login. On a cold boot of the device, the gaze correction function may be accessed and used with an average eye model to improve gaze-based interactions.

20 Claims, 8 Drawing Sheets

(51) Int. Cl.
*G06T 7/70* (2017.01)
*G06V 40/19* (2022.01)
*H04L 9/08* (2006.01)

(52) U.S. Cl.
CPC .. *H04L 9/0866* (2013.01); *G06T 2207/30201* (2013.01)

(58) Field of Classification Search
CPC ......... G06T 2207/30201; H04L 9/0866; H04L 9/3231; G02B 27/0093
See application file for complete search history.

SYNTHETIC GAZE ENROLLMENT

This application claims benefit of priority to U.S. Provisional Application Ser. No. 63/376,935, entitled "Synthetic Gaze Enrollment," filed Sep. 23, 2022, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for synthetic gaze enrollment for gaze interaction after cold boot of a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking.

In such systems, during an initial calibration or enrollment process, a multidimensional personalized model of the user's eye may be generated from one or more images of the eye captured as described above. This personalized eye model may then be used in various algorithms, for example in the gaze estimation process, during use of the device. The personalized eye model may include information such as a cornea surface model, iris and pupil model, eye center, entrance pupil, pupillary or optical axis (a vector which passes through the geometric eye center and the entrance pupil), and a kappa angle between the optical axis and the visual axis.

However, a personalized eye model may be privacy- and security-sensitive information, and thus may be stored as encrypted data when the user is not logged in to the device. Thus, after a cold boot of the device, gaze enrollment data including the personalized eye model is not accessible due to the security and privacy concerns until the user logs in using a passcode or other secure login method, after which the secured data can be encrypted. However, entering a passcode to log in may be performed via a gaze-based interface. Thus, to calibrate the device for gaze interaction before login, since the personalized eye model is not available, a privacy-insensitive gaze calibration model is needed to enable or improve gaze-based passcode interaction for user login. This gaze calibration model, which may be referred to as a screen-space model, may be estimated in a gaze enrollment process using a synthetic gaze.

In embodiments of an enrollment method to generate the screen-space model, the N-dimensional personalized eye model is used to generate synthetic gaze features at ground-truth eye poses $G_g$. Corresponding synthetic gaze poses $G_s$ are then estimated from the synthetic gaze features using an average eye model (for example, an eye model generated from the features of multiple examples of eyes, which may be stored unencrypted on the device since it is not privacy- or security sensitive). A linear regression is then applied between $G_g$ and $G_s$ to generate a gaze correction function, which may be a two-dimensional screen space model. The gaze correction function essentially contains data that represents differences between the synthetic gaze $G_s$ of the subject eye at the display and that of the average eye model $G_g$ at the display.

The gaze correction function does not contain security- and privacy-sensitive information of the user. Further, since the method collapses a hyperdimensional space (the N-dimensional personalized eye model) into two dimensions (the gaze correction function), the personalized eye model cannot be recovered from the gaze correction function, and thus the gaze correction function can be stored unencrypted and available for use during a cold boot of the device prior to login.

To generate the gaze correction function, the user does not have to look at ground truth points to produce the eye features needed to generate the model. The personalized eye model can be used to generate eye poses $G_g$, mapped on the display screen. Corresponding eye poses $G_s$ may be generated from the synthetic gaze features using an average eye model. The difference between $G_g$ and $G_s$ is then determined using linear regression, which generates a regression-based model (the gaze correction function).

After the gaze correction function is generated in an enrollment process, on cold boot of the device, the gaze correction function may be accessed (since it is stored unencrypted) and used with the average eye model to improve gaze-based interactions, for example passcode entry, prior to login. After a successful login, the personalized eye model can be decrypted and used for gaze-based interactions and other gaze-based functions.

In some embodiments, the system may detect that the gaze correction function may need updating or supplementing. For example, the system may detect that the user is wearing the device differently, or is wearing contacts, or that an extra lens (e.g., a prescription lens) has been added to the device. In these cases, a new gaze correction function may be generated (note that the personalized eye model may also be updated accordingly, and the gaze correction function may be generated using the updated eye model). The old gaze correction function may be replaced by the new model, or alternatively, both models may be stored. Thus, in some embodiments, there may be multiple gaze correction functions stored to select from at cold boot, and the system may select a best model from among them to use based on one or more criteria.

Figure 1:
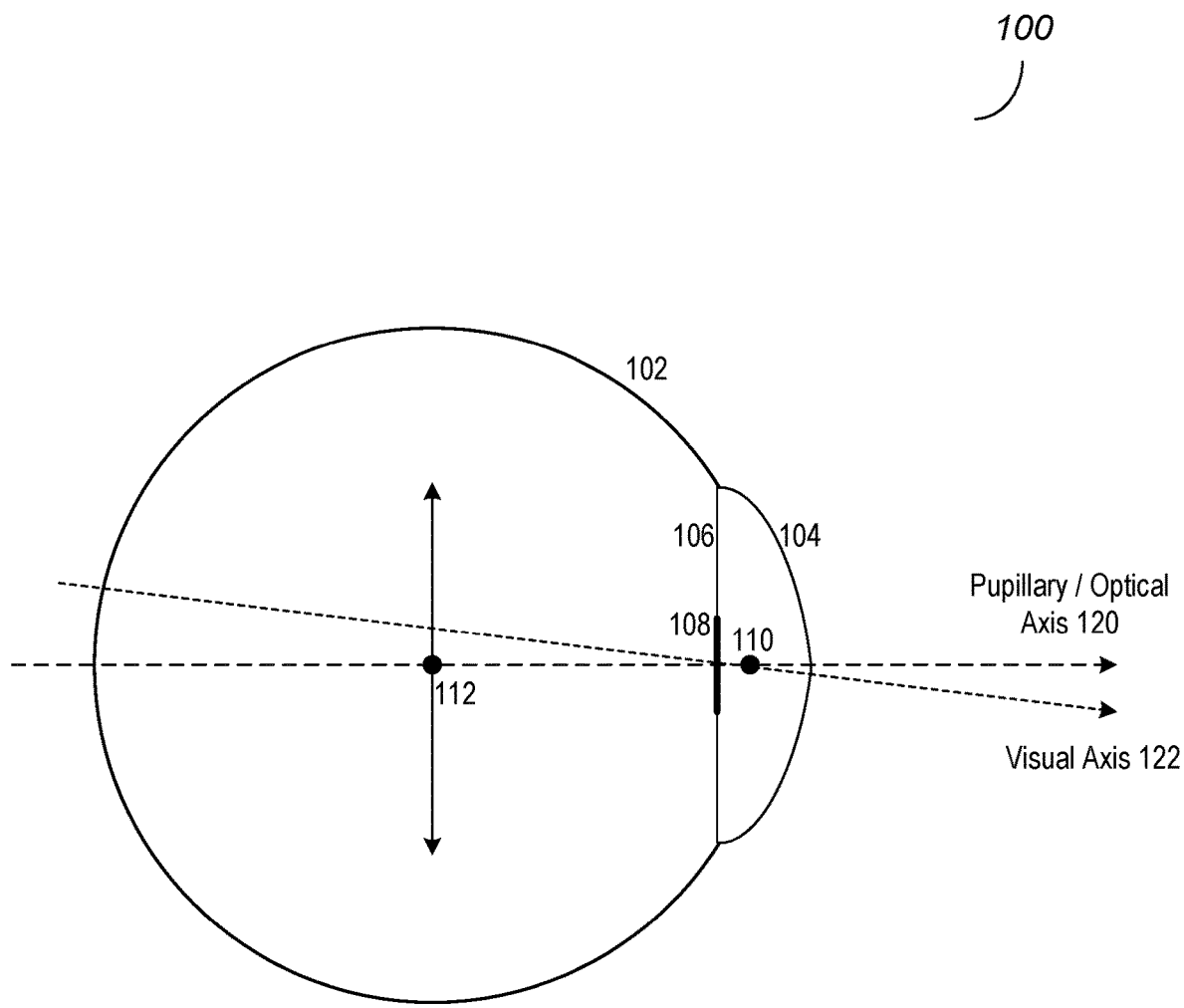
FIG. 1 graphically illustrates an N-dimensional model of an eye, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for synthetic gaze enrollment for gaze interaction after cold boot of a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking.

In such systems, during an initial calibration or enrollment process, a multidimensional personalized model of the user's eye may be generated from one or more images of the eye captured as described above. FIG. 1 graphically illustrates an N-dimensional model 100 of an eye, according to some embodiments. Physical components of an eye may include a sclera 102, cornea 104, iris 106, and pupil 108. In some embodiments, during an initial calibration or enrollment process, an N-dimensional model of the user's eye 100 may be generated from one or more images of the eye 100. In an example method, one or more infrared (IR) light sources emit IR light towards a user's eye. A portion of the IR light is reflected off the eye and captured by an eye tracking camera. Two or more images captured by the eye tracking camera may be input to an eye model generating process, for example implemented by one or more processors of a controller of the HMD. The process may determine the shapes and relationships of the eye's components based at least in part on positions of the glints (reflections of the point light sources) in the two or more captured images. This information may then be used to generate the personalized eye model. The personalized eye model may include information such as a cornea surface model, iris and pupil model, eye center 112, entrance pupil 110, pupillary or optical axis 120 (a vector which passes through the eye center 112 and the entrance pupil 110), and a kappa angle between the optical axis 120 and the visual axis 122 of the eye. This personalized eye model may then be used in various algorithms, for example in the gaze estimation process, during use of the device. The personalized eye model may then be used in various algorithms, for example in the gaze estimation process, during use of the device.

However, a personalized eye model may be privacy- and security-sensitive information, and thus may be stored as encrypted data when the user is not logged in to the device. Thus, after a cold boot of the device, gaze enrollment data including the personalized eye model is not accessible due to the security and privacy concerns until the user logs in using a passcode or other secure login method, after which the secured data can be encrypted. However, entering a passcode to log in may be performed via a gaze-based interface. Thus, to calibrate the device for gaze interaction before login, since the personalized eye model is not available, a privacy-insensitive gaze calibration model is needed to enable or improve gaze-based passcode interaction for user login. This gaze calibration model, which may be referred to as a screen-space model, may be estimated in a gaze enrollment process using a synthetic gaze.

Figure 2:
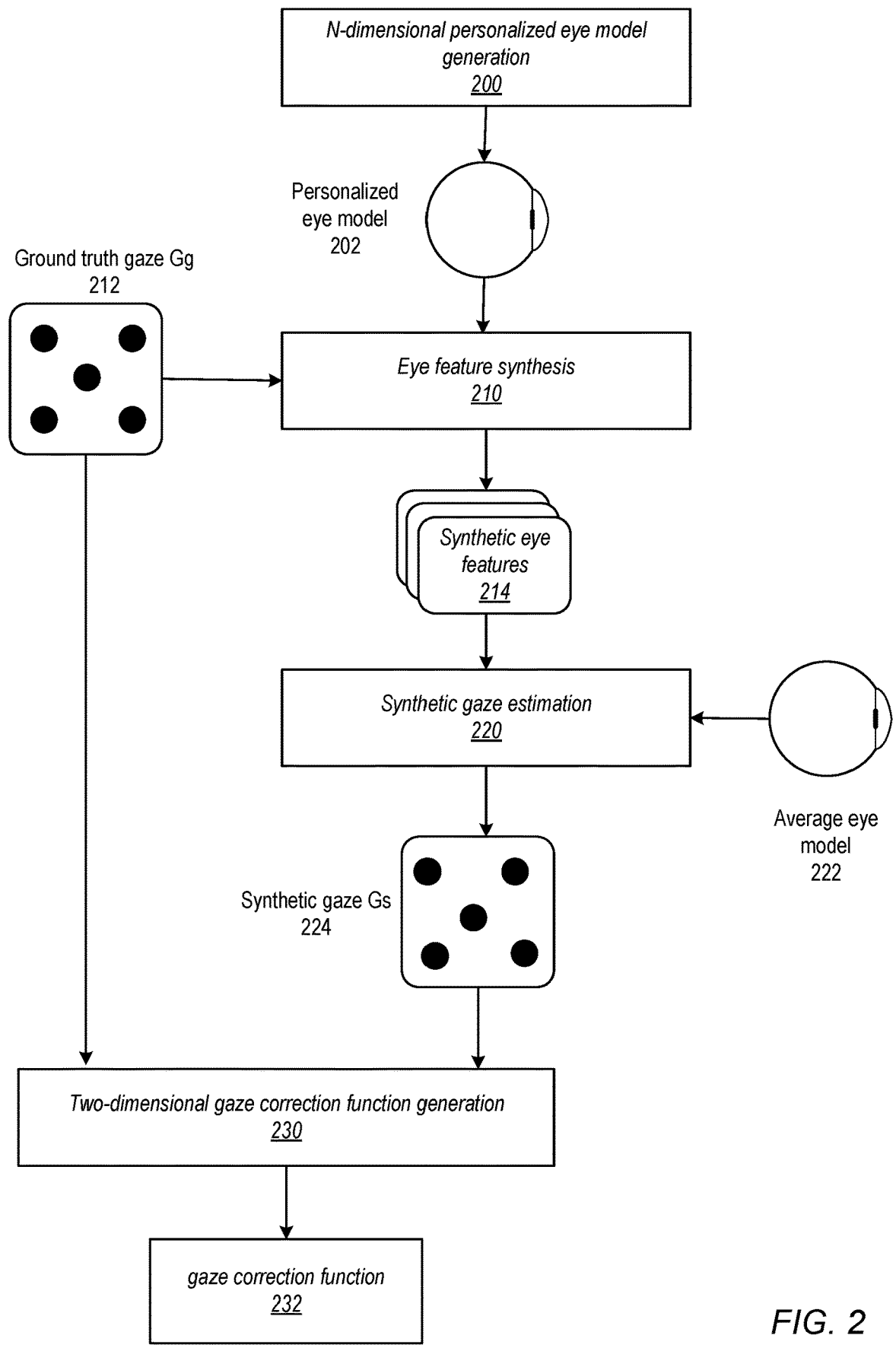
FIG. 2 graphically illustrates a method for generating a two-dimensional gaze correction function for an eye during an enrollment process that can then be used to calibrate gaze interactions at cold boot of a device, according to some embodiments.

FIG. 2 graphically illustrates a method for generating a two-dimensional gaze correction function for an eye during an enrollment process that can then be used to calibrate gaze interactions at cold boot of a device, according to some embodiments. In embodiments of an enrollment method to generate the screen-space model, the N-dimensional personalized eye model 202 is generated 200 and used to synthesize 210 synthetic gaze features 214 at ground-truth eye poses $G_g$ 212. Corresponding synthetic gaze poses $G_s$ 224 are then estimated 220 from the synthetic gaze features 214 using an average eye model 222 (for example, an eye model generated from the features of multiple examples of eyes, which may be stored unencrypted on the device since it is not privacy- or security sensitive). A linear regression 230 is then applied between $G_g$ and $G_s$ to generate the two-dimensional gaze correction function 232. The gaze correction function 232 essentially contains data that represents differences between the gaze $G_s$ 224 of the subject eye at the display and that of the average eye model $G_g$ 212 at the display.

The gaze correction function 232 does not contain security- and privacy-sensitive information of the user. Further, since the method collapses a hyperdimensional space (the N-dimensional personalized eye model 202) into two dimensions (the gaze correction function 232), the personalized eye model 202 cannot be recovered from the gaze correction function 202, and thus the gaze correction function 232 can be stored unencrypted and available for use during a cold boot of the device prior to login.

Figure 3A:
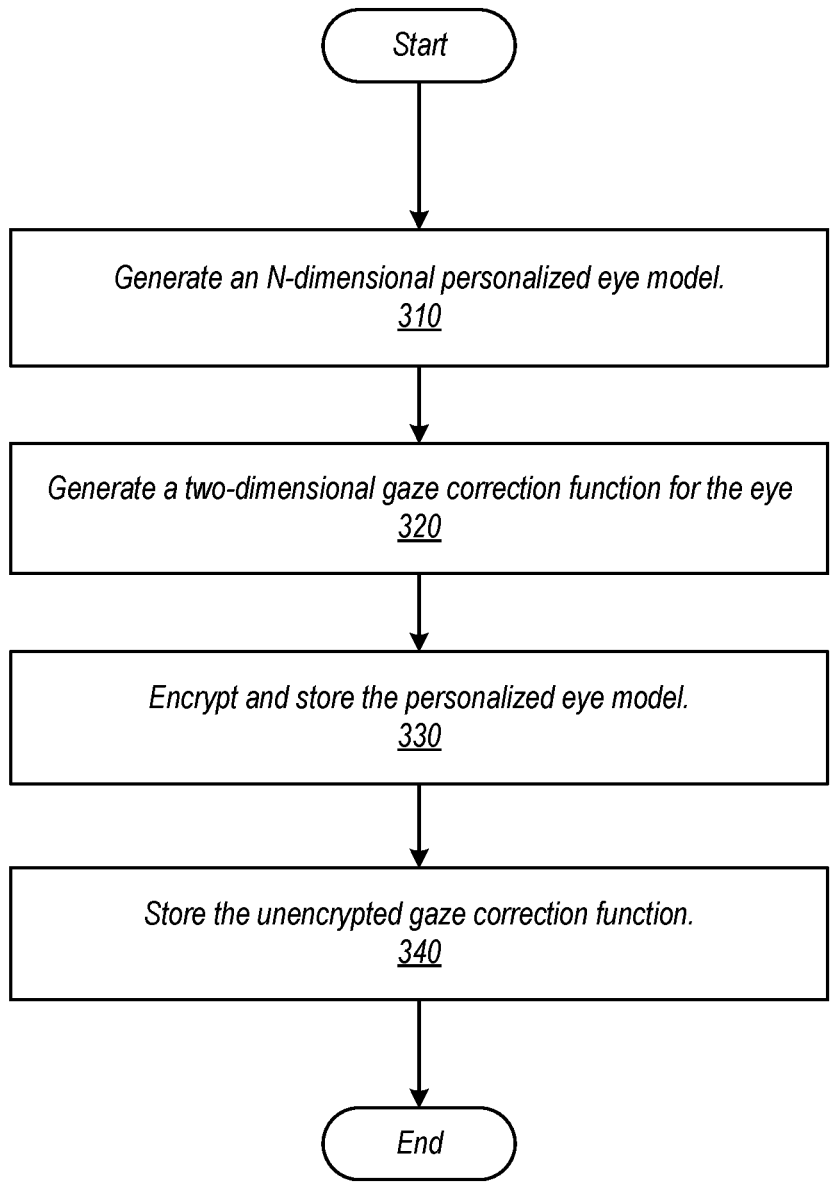
FIGS. 3A and 3B are flowcharts of a method for generating a gaze correction function for an eye, according to some embodiments.
Figure 3B:
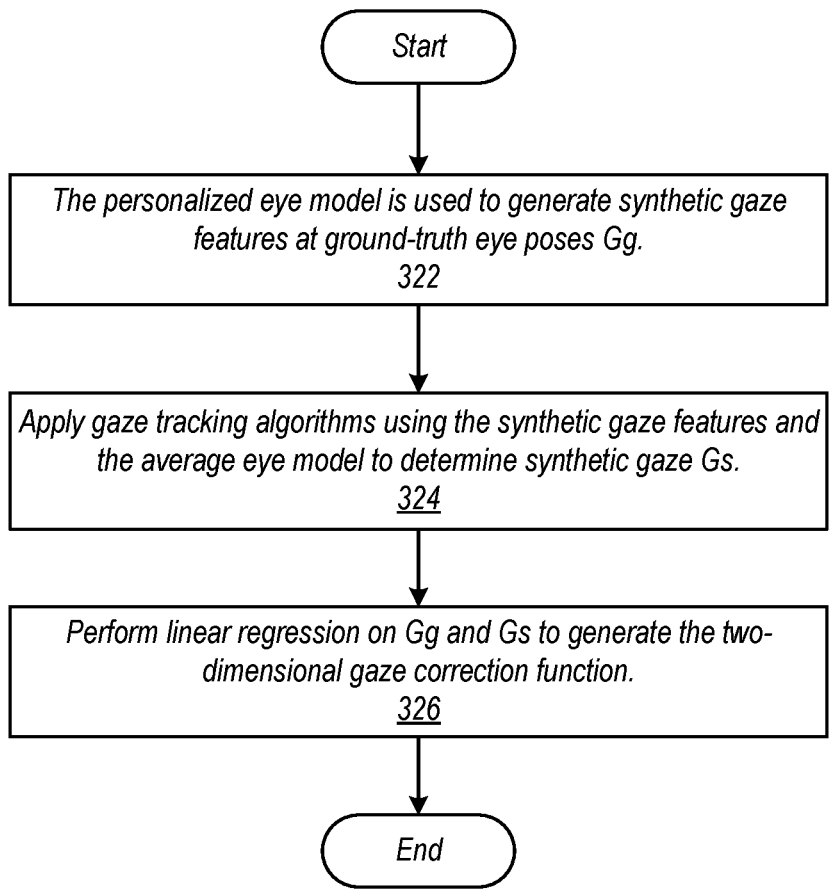

FIGS. 3A and 3B are flowcharts of a method for generating a gaze correction function for an eye, according to some embodiments. Referring to FIG. 3A, as indicated at 310, an N-dimensional personalized eye model may be generated. As indicated at 320, a two-dimensional gaze correction function for the eye may be generated. As indicated at 330, the personalized eye model may be encrypted and stored. As indicated at 340, the unencrypted gaze correction function may be stored.

FIG. 3B is a flowchart of a process performed at element 320 of FIG. 3A to generate the two-dimensional gaze correction function. As indicated at 322, the personalized eye model is used to generate synthetic gaze features at ground-truth eye poses $G_g$. As indicated at 324, gaze tracking algorithms are applied using the synthetic gaze features and the average eye model to determine synthetic gaze $G_s$. As indicated at 326, a linear regression is performed on $G_g$ and $G_s$ to generate the two-dimensional gaze correction function. The gaze correction function essentially contains data that represents differences between the synthetic gaze $G_s$ of the subject eye at the display and that of the average eye model $G_g$ at the display.

After the gaze correction function is generated in an enrollment process, on cold boot of the device, the gaze correction function may be accessed (since it is stored unencrypted) and used with the average eye model to improve gaze-based interactions, for example passcode entry, prior to login. After a successful login, the personalized eye model can be decrypted and used for gaze-based interactions and other gaze-based functions.

Figure 4:
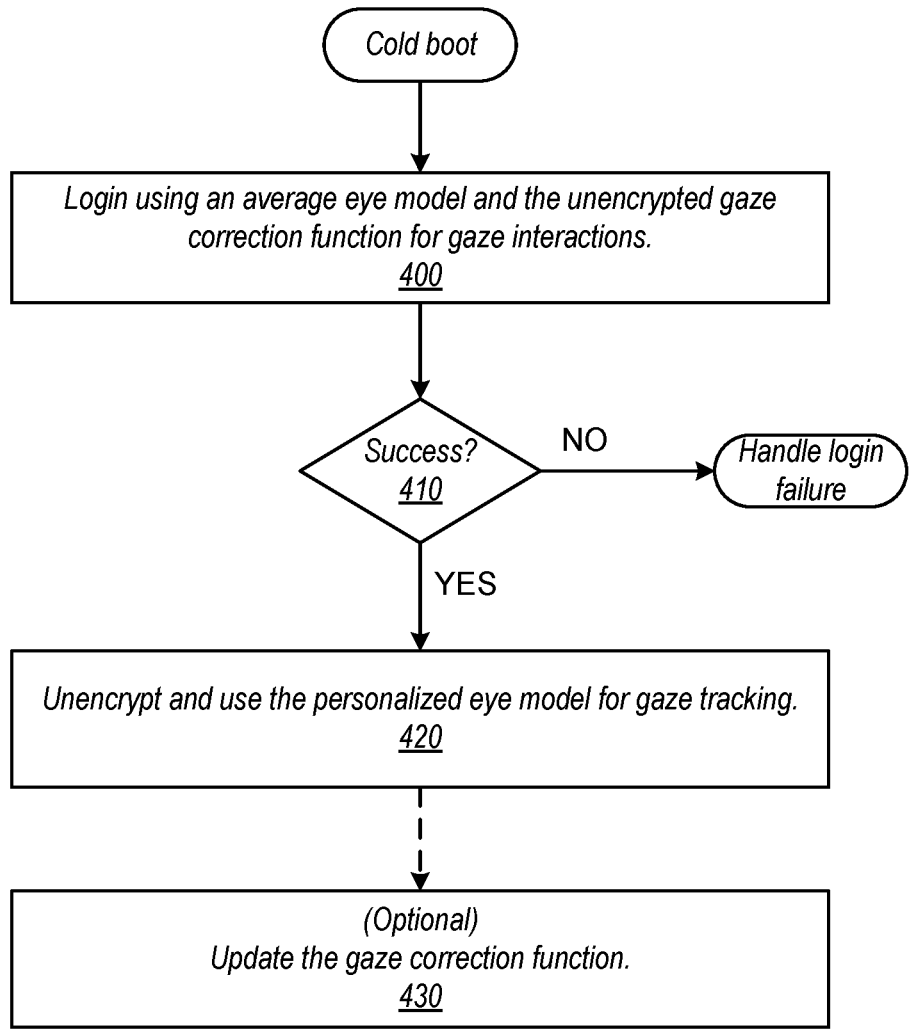
FIG. 4 is a high-level flowchart of a method for using a gaze correction function during a cold boot of a device, according to some embodiments.

FIG. 4 is a high-level flowchart of a method for using a gaze correction function during a cold boot of a device, according to some embodiments. As indicated a 400, at cold boot, a user may log in; an average eye model, with corrections applied by the unencrypted gaze correction function, is used for gaze interactions. For example, the user may log in by entering a passcode using a gaze-based interface. At 410, if the login was successful, then as indicated at 420 the personalized eye model may be unencrypted and used for gaze tracking while the system is in use.

In some embodiments, the gaze correction function may be updated if necessary, as indicated at 430. In some embodiments, the system may detect that the gaze correction function may need updating or supplementing. For example, the system may detect that the user is wearing the device differently, or is wearing contacts, or that an extra lens (e.g., a prescription lens) has been added to the device. In these cases, a new gaze correction function may be generated (note that the personalized eye model may also be updated accordingly, and the gaze correction function may be generated using the updated eye model). The old gaze correction function may be replaced by the new model, or alternatively, both models may be stored. Thus, in some embodiments, there may be multiple gaze correction functions stored to select from at cold boot, and the system may select a best model from among them to use based on one or more criteria.

Figure 5:
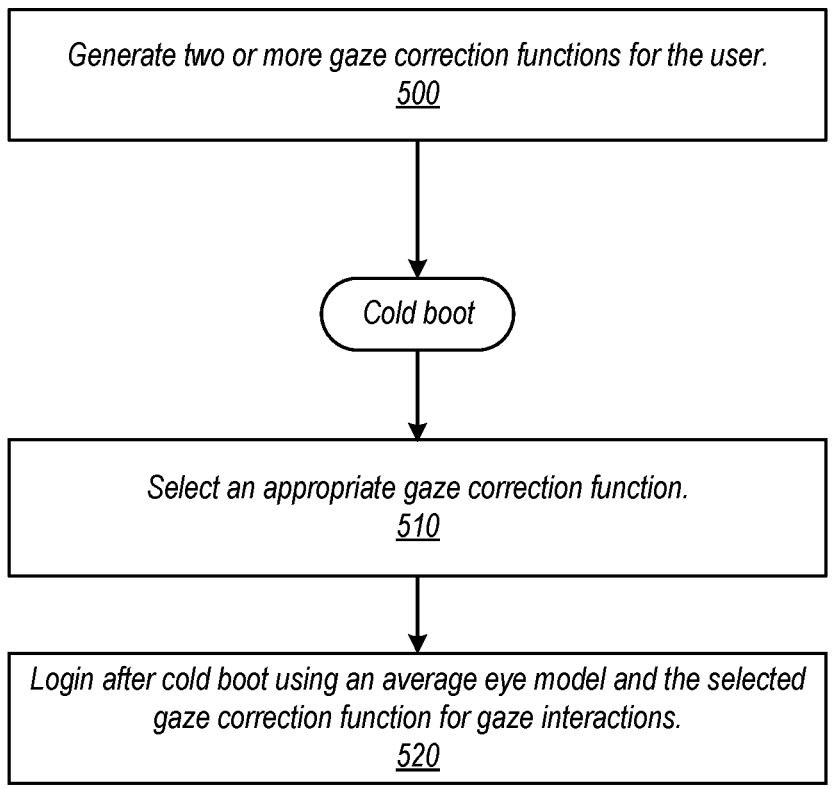
FIG. 5 is a high-level flowchart of a method for generating and using multiple gaze correction functions for an eye, according to some embodiments.

FIG. 5 is a high-level flowchart of a method for generating and using multiple gaze correction functions for an eye, according to some embodiments. As indicated at 500, two or more gaze correction functions may be generated and stored as described in reference to element 430 of FIG. 4. At cold boot, as indicated at 510, an appropriate one of the stored gaze correction functions may be selected, for example based on detected location of the device on the user's head, detection of a contact lens, or detection of a supplemental lens in the device. As indicated at 520, the user may log in; an average eye model, with corrections applied by the selected gaze correction function, is used for gaze interactions. For example, the user may log in by entering a passcode using a gaze-based interface.

While embodiments are generally described and illustrated with reference to one eye, there may be eye tracking cameras for both eyes, and gaze tracking may be performed for both eyes, and thus the technology described herein may be implemented for both the left and right eyes in an HMD.

Figure 6A:
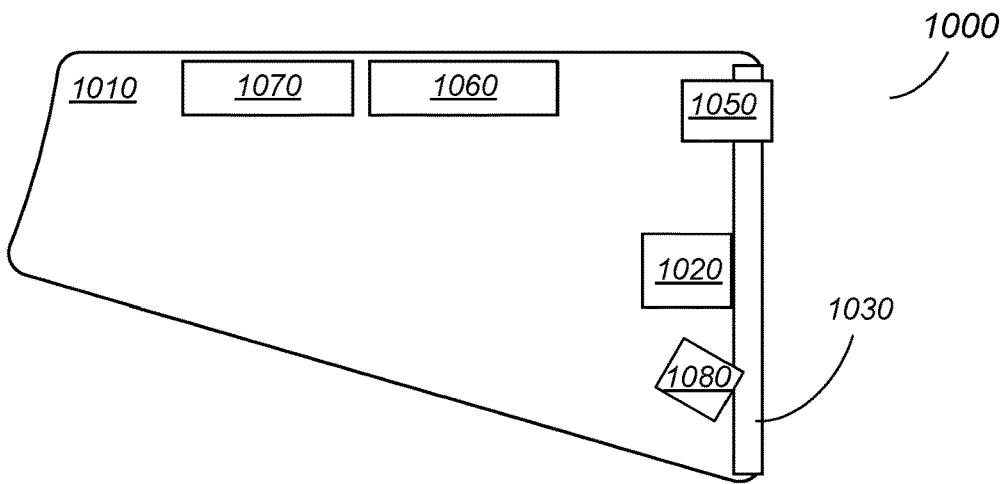
FIGS. 6A through 6C illustrate example devices in which the methods of FIGS. 1 through 5 may be implemented, according to some embodiments.
Figure 6B:
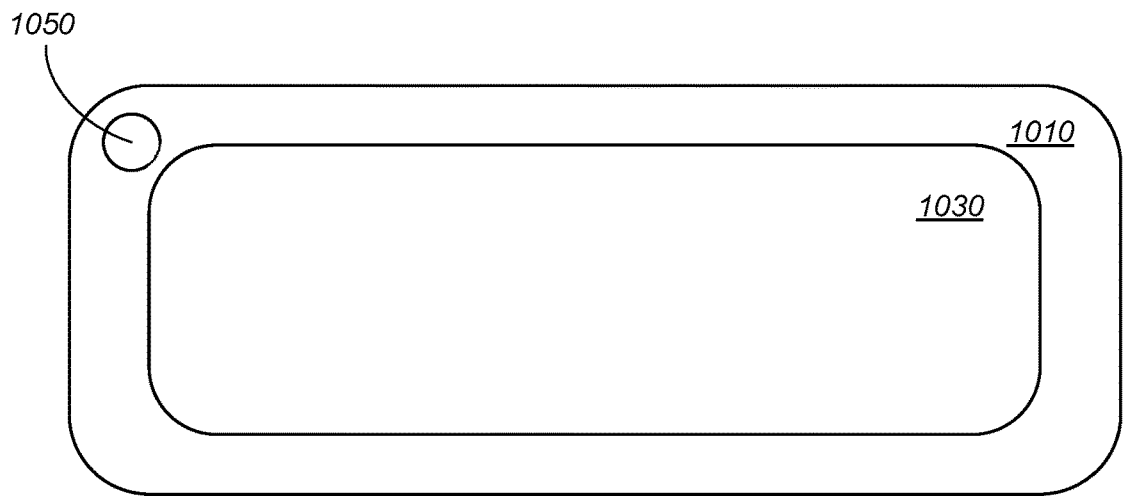
Figure 6C:
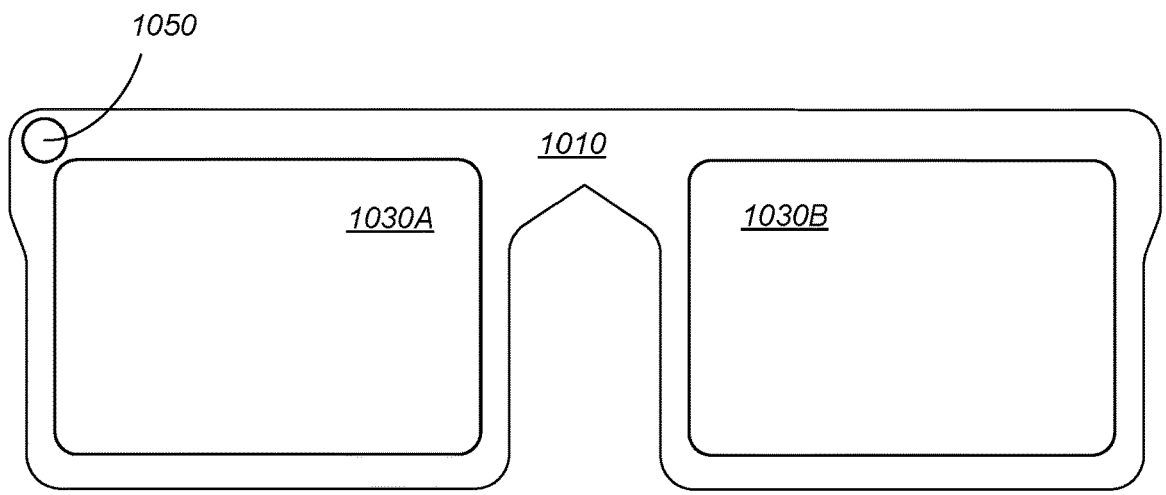

FIGS. 6A through 6C illustrate example devices in which the methods of FIGS. 1 through 5 may be implemented, according to some embodiments. Note that the HMDs 1000 as illustrated in FIGS. 6A through 6C are given by way of example, and are not intended to be limiting. In various embodiments, the shape, size, and other features of an HMD 1000 may differ, and the locations, numbers, types, and other features of the components of an HMD 1000 and of the eye imaging system. FIG. 6A shows a side view of an example HMD 1000, and FIGS. 6B and 6C show alternative front views of example HMDs 1000, with FIG. 6A showing device that has one lens 1030 that covers both eyes and FIG. 6B showing a device that has right 1030A and left 1030B lenses.

HMD 1000 may include lens(es) 1030, mounted in a wearable housing or frame 1010. HMD 1000 may be worn on a user's head (the "wearer") so that the lens(es) is disposed in front of the wearer's eyes. In some embodiments, an HMD 1000 may implement any of various types of display technologies or display systems. For example, HMD 1000 may include a display system that directs light that forms images (virtual content) through one or more layers of waveguides in the lens(es) 1020; output couplers of the waveguides (e.g., relief gratings or volume holography) may output the light towards the wearer to form images at or near the wearer's eyes. As another example, HMD 1000 may include a direct retinal projector system that directs light towards reflective components of the lens(es); the reflective lens(es) is configured to redirect the light to form images at the wearer's eyes.

In some embodiments, HMD 1000 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras 1020 (e.g., infrared (IR) cameras) that capture views of the user's eyes, one or more world-facing or PoV cameras 1050 (e.g., RGB video cameras) that can capture images or video of the real-world environment in a field of view in front of the user, and one or more ambient light sensors that capture lighting information for the environment. Cameras 1020 and 1050 may be integrated in or attached to the frame 1010. HMD 1000 may also include one or more light sources 1080 such as LED or infrared point light sources that emit light (e.g., light in the IR portion of the spectrum) towards the user's eye or eyes.

A controller 1060 for the XR system may be implemented in the HMD 1000, or alternatively may be implemented at least in part by an external device (e.g., a computing system or handheld device) that is communicatively coupled to HMD 1000 via a wired or wireless interface. Controller 1060 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1060 may render frames (each frame including a left and right image) that include virtual content based at least in part on inputs obtained from the sensors and from an eye tracking system, and may provide the frames to the display system.

Memory 1070 for the XR system may be implemented in the HMD 1000, or alternatively may be implemented at least in part by an external device (e.g., a computing system) that is communicatively coupled to HMD 1000 via a wired or wireless interface. The memory 1070 may, for example, be used to record video or images captured by the one or more cameras 1050 integrated in or attached to frame 1010. Memory 1070 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 6A through 6C only show light sources 1080 and cameras 1020 and 1050 for one eye, embodiments may include light sources 1080 and cameras 1020 and 1050 for each eye, and gaze tracking may be performed for both eyes. In addition, the light sources, 1080, eye tracking camera 1020 and PoV camera 1050 may be located elsewhere than shown.

Embodiments of an HMD 1000 as illustrated in FIGS. 6A-6C may, for example, be used in augmented or mixed (AR) applications to provide augmented or mixed reality views to the wearer. HMD 1000 may include one or more sensors, for example located on external surfaces of the HMD 1000, that collect information about the wearer's external environment (video, depth information, lighting information, etc.); the sensors may provide the collected information to controller 1060 of the XR system. The sensors may include one or more visible light cameras 1050 (e.g., RGB video cameras) that capture video of the wearer's environment that, in some embodiments, may be used to provide the wearer with a virtual view of their real environment. In some embodiments, video streams of the real environment captured by the visible light cameras 1050 may be processed by the controller 1060 of the HMD 1000 to render augmented or mixed reality frames that include virtual content overlaid on the view of the real environment, and the rendered frames may be provided to the display system. In some embodiments, input from the eye tracking camera 1020 may be used in a PCCR gaze tracking process executed by the controller 1060 to track the gaze/pose of the user's eyes for use in rendering the augmented or mixed reality content for display. In addition, one or more of the methods as illustrated in FIGS. 1 through 5 may be implemented in the HMD to provide synthetic gaze enrollment for the HMD 1000.

Figure 7:
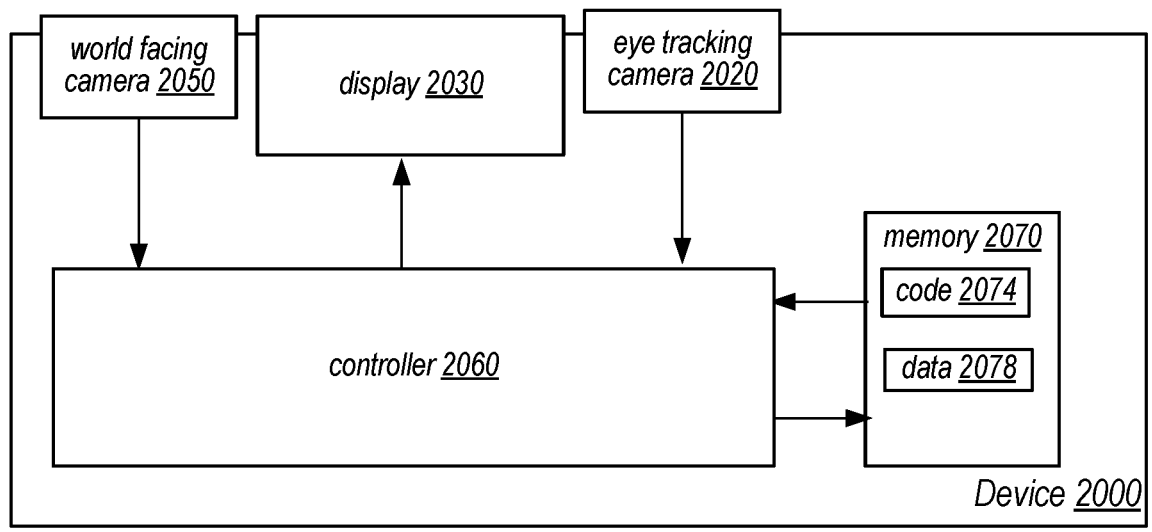
FIG. 7 is a block diagram illustrating an example device that may include components and implement methods as illustrated in FIGS. 1 through 5, according to some embodiments.

FIG. 7 is a block diagram illustrating an example device that may include components and implement methods as illustrated in FIGS. 1 through 5, according to some embodiments.

In some embodiments, an XR system may include a device 2000 such as a headset, helmet, goggles, or glasses. Device 2000 may implement any of various types of display technologies. For example, device 2000 may include a transparent or translucent display 2030 (e.g., eyeglass lenses) through which the user may view the real environment and a medium integrated with display 2030 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors that collect information about the user's environment (video, depth information, lighting information, etc.). The sensors may provide the information to the controller 2060 of the XR system. In some embodiments, the sensors may include, but are not limited to, at least one visible light camera (e.g., an RGB video camera) 2050, ambient light sensors, and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 1 through 5 may be implemented in device 2000 to provide synthetic gaze enrollment for the device 2000.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a display configured to be positioned in front of an eye;
an eye-facing camera configured to capture images of the eye; and
a controller comprising one or more processors configured to:
generate a multidimensional personalized model of the eye based on images captured by the eye-facing camera;
generate synthetic gaze features for the personalized model at ground-truth eye poses;
estimate synthetic eye poses from the synthetic gaze features using an average eye model; and
generate a gaze correction function from the ground-truth eye poses and the synthetic eye poses, wherein the gaze correction function represents differences between the ground-truth eye poses at the display and the synthetic eye poses at the display.

2. The device as recited in claim 1, wherein, to generate a gaze correction function from the ground-truth eye poses and the synthetic eye poses, a linear regression technique is applied to the ground-truth eye poses and the synthetic eye poses.

3. The device as recited in claim 1, wherein the gaze correction function is a two-dimensional screen space model.

4. The device as recited in claim 1, wherein the controller is further configured to:
encrypt and store the personalized eye model; and
store the gaze correction function in an unencrypted format.

5. The device as recited in claim 4, wherein the controller is further configured to, upon a cold boot of the device, read the stored gaze correction function and apply the gaze correction function to an average eye model to perform gaze-based interactions.

6. The device as recited in claim 5, wherein the gaze-based interactions include entering a passcode to log in to the device.

7. The device as recited in claim 6, wherein the controller is further configured to, after a successful login:
unencrypt the stored personalized eye model; and
use the personalized eye model for gaze-based interactions.

8. The device as recited in claim 6, wherein the controller is further configured to, after a successful login:
detect that the stored gaze correction function needs to be updated or supplemented; and
in response to said detection, generate and store a new gaze correction function.

9. The device as recited in claim 1, wherein the controller is further configured to:
generate and store two or more gaze correction functions; and
upon a cold boot of the device, select one of the two or more stored gaze correction functions and apply the selected gaze correction function to an average eye model to perform gaze-based interactions.

10. The device as recited in claim 1, wherein the device is a head-mounted device (HMD) of an extended reality (XR) system.

11. A method, comprising:
performing, by a controller comprising one or more processors:
generating a multidimensional personalized model of an eye based on images captured by an eye-facing camera;
generating synthetic gaze features for the personalized model at ground-truth eye poses;
estimating synthetic eye poses from the synthetic gaze features using an average eye model; and
generating a gaze correction function from the ground-truth eye poses and the synthetic eye poses, wherein the gaze correction function represents differences between the ground-truth eye poses at a display and the synthetic eye poses at the display.

12. The method as recited in claim 11, wherein generating a gaze correction function from the ground-truth eye poses and the synthetic eye poses comprises applying a linear regression technique to the ground-truth eye poses and the synthetic eye poses.

13. The method as recited in claim 12, further comprising:
encrypting and storing the personalized eye model; and
storing the gaze correction function as an unencrypted screen space model.

14. The method as recited in claim 13, further comprising, upon a cold boot of a device, applying the gaze correction function to an average eye model to perform gaze-based interactions, wherein the gaze-based interactions include entering a passcode to log in to the device.

15. The method as recited in claim 14, further comprising, after a successful login:
unencrypting the stored personalized eye model; and
using the personalized eye model for gaze-based interactions.

16. The method as recited in claim 14, further comprising, after a successful login:
detecting that the stored gaze correction function needs to be updated or supplemented; and
in response to said detecting, generating and storing a new gaze correction function.

17. The method as recited in claim 11, further comprising:
generating and storing two or more gaze correction functions; and
upon a cold boot of the device, selecting one of the two or more stored gaze correction functions and applying the selected gaze correction function to an average eye model to perform gaze-based interactions.

18. The method as recited in claim 11, wherein the controller, display, and eye-facing camera are components of a head-mounted device (HMD) of an extended reality (XR) system.

19. A system, comprising:
a head-mounted device (HMD), comprising:
a display configured to be positioned in front of an eye;
an eye-facing camera configured to capture images of the eye; and
a controller comprising one or more processors configured to:
generate a multidimensional personalized model of the eye based on images captured by the eye-facing camera;
generate synthetic gaze features for the personalized model at ground-truth eye poses;
estimate synthetic eye poses from the synthetic gaze features using an average eye model;
apply a linear regression technique to the ground-truth eye poses and the synthetic eye poses to generate a gaze correction function, wherein the gaze correction function represents differences between the ground-truth eye poses at the display and the synthetic eye poses at the display;
encrypt and store the personalized eye model; and
store the gaze correction function as an unencrypted screen space model.

20. The system as recited in claim 19, wherein the controller is further configured to, upon a cold boot of the HMD, read the stored gaze correction function and apply the gaze correction function to an average eye model to perform gaze-based interactions, wherein the gaze-based interactions include entering a passcode to log in to the device.

* * * * *